United States Patent
Autenrieth et al.

(10) Patent No.: US 6,447,736 B1
(45) Date of Patent: Sep. 10, 2002

(54) SYSTEM FOR THE WATER VAPOR REFORMING OF A HYDROCARBON

(75) Inventors: Rainer Autenrieth, Erbach; Stefan Boneberg, Blaustein; Andreas Christen, Kehr; Dietmar Heil, Hoerenhausen; Barbara Strobel, Dornstadt; Steffen Wieland, Stuttgart; Detlef zur Megede, Kirchheim/Teck, all of (DE)

(73) Assignee: Xcellsis GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/206,379

(22) Filed: Dec. 7, 1998

(30) Foreign Application Priority Data

Dec. 5, 1997 (DE) .......................... 197 54 012

(51) Int. Cl.$^7$ .................................. B01J 8/00
(52) U.S. Cl. .................... 422/190; 48/61; 48/127.9; 48/198.1; 48/199; 48/199 FM; 422/187; 422/188; 422/189; 422/191; 422/198; 422/211
(58) Field of Search .............. 48/61, 127.9, 198.1, 48/199, 199 FM; 422/187, 188, 189, 190, 191, 198, 211; 252/376; 423/648.1, 650, 651, 652, 655

(56) References Cited

U.S. PATENT DOCUMENTS 4,746,329 A    5/1988  Christner et al. .............. 48/61
5,209,906 A  *  5/1993  Watkins et al. ............. 422/200
5,516,344 A    5/1996  Corrigan .................... 48/127.9

FOREIGN PATENT DOCUMENTS

| DE | 38 03 080 | 8/1989 |
| EP | 0 529 329 | 3/1993 |
| EP | 861 802 A2 * | 9/1998 |
| EP | 0 861 802 | 9/1998 |
| JP | H4-325401 | * 11/1992 |
| JP | 07 126001 | 5/1995 |
| JP | 07126001 | * 5/1995 |
| JP | 07 232901 | 9/1995 |

OTHER PUBLICATIONS

Patent Abstracts of Japan, 4–325401 A, Nov. 13, 1992, Osaki et al.*
Patent Abstracts of Japan, 5–105403 A, Apr. 27, 1993, Koga.*
Patent Abstracts of Japan, 07126001 A, May 16, 1995, Katsuji et al.*

* cited by examiner

Primary Examiner—Jerry D. Johnson
Assistant Examiner—Frederick Varcoe
(74) Attorney, Agent, or Firm—Crowell & Moring LLP

(57) ABSTRACT

A system for the water vapor reforming of a hydrocarbon includes a modular reactor unit of the plate stack and/or tube bundle type that, in an integrated manner, contains an evaporator, a prereforming unit, a main reformer, a CO removal unit and a catalytic burner unit. The evaporator and the main reformer are in a thermal contact with the catalytic burner unit and, the prereforming unit is in a thermal contact with the CO removal unit.

15 Claims, 2 Drawing Sheets

SYSTEM FOR THE WATER VAPOR REFORMING OF A HYDROCARBON

BACKGROUND AND SUMMARY OF THE INVENTION

This application claims the priority of German Patent Application No. 197 54 012.0, filed Dec. 5, 1997, the disclosure of which is expressly incorporated by reference herein.

The present invention relates to a system for the water vapor reforming of a hydrocarbon. Systems of this type are used, for example, in mobile applications such as in fuel-cell operated motor vehicles for the water vapor reforming of methanol carried along in liquid form in order to provide the hydrogen needed for the fuel cells without requiring a large hydrogen storage device. For this use, a compact construction of the system is required that can be implemented with a relatively low weight and expenditures that are as low as possible. Furthermore, fast reacting of the system to load changes is desirable for motor vehicle applications, for which a compact construction is also favorable. Other desirable characteristics of mobile systems are a high efficiency and low control and automatic control expenditures, whereby a high system reliability can be achieved.

Systems for the water vapor reformation of hydrocarbon are known in which certain system components are integrated into a respective joint constructional part for achieving a compact construction. Thus, Japanese Laid-Open Patent Applications JP 62138306 A, JP 63021203 A and JP 63040701 A describe reforming systems in which the reformer carrying out the reforming reaction and an evaporator connected in front of it are integrated into a common reactor component. A burner is also assigned to the common reactor component in which fuel is burned while igniting to directly heat the evaporator. In addition, the burner may heat the reformer by means of its hot combustion exhaust gases.

In the reforming system disclosed in U.S. Pat. No. 5,516,344, the reformer, together with a CO shift converter connected behind it, are integrated in a common component to which a burner is assigned that burns a fed combustible mixture while igniting. The hot combustion exhaust gases will then, among others, heat the reformer and the CO shift converter.

In Japanese Laid-Open Patent Application JP 07126001 A, a system is described that contains a modular reactor unit of the plate stack type. In an integrated manner, this modular reactor unit contains an evaporator, a reformer and a CO-oxidant. These three system components are serially arranged in a transverse stack direction behind one another in the form of a first group of alternating, plate layers. A burner is connected in front of the evaporator, in which burner a fed mixture is burned while igniting. The hot combustion exhaust gases are guided in parallel to the reforming gas flow through a second group of alternating plate layers forming a heat exchanger structure that alternate with the plate layers of the first group and in the process heat the evaporator, the reformer and the CO-oxidant.

U.S. Pat. No. 4,746,329 discloses a methanol reforming reactor having a cylindrical construction and consisting of several radially successive annuli. On the bottom side of the reactor cylinder, a burner unit is situated that may be formed by a catalytic burner. The hot burner exhaust gases are guided through the radially most exterior annulus upwards and are then deflected into the radially interior adjacent annulus, where they are in a thermal contact with a reforming annulus adjoining radially on the inside. In this case, an upper part of the reforming space extends beyond the exterior annuli carrying the combustion gas so that a lower operating temperature exists in this area. This cooler upper reforming space area is used as a CO shift unit. On the inside, the reforming space is adjoined by an evaporator annulus which, radially toward the inside by way of a cylindrical wick, adjoins an interior tempering space, into which the combustion gases are deflected after a downward flow through the second exterior annulus in a lower cylinder area. A hydrogen containing anode gas of a fuel cell system is used as the fuel for the burner unit. The combustion exhaust gases therefore contain water vapor, of which, after the exiting of the combustion exhaust gases on the upper cylinder face, at least a portion is fed to the evaporator.

German Published Patent Application DE 38 03 080 Al discloses a reforming system for generating synthesis gases containing hydrogen, carbon monoxide and carbon dioxide from hydrocarbon-containing charged substances as well as an operating process therefor. The charged substances are first subjected to an at least one-stage primary reforming; then to a partial oxidation; and subsequently to another secondary reforming; and finally to a carbon monoxide conversion. In this case, the waste heat of the exothermal carbon monoxide conversion is used for the primary vapor reforming, for the purpose of which the corresponding primary reforming stage and the CO conversion stage are in a thermal contact by way of a heat-conducting separating wall.

The present invention is based on the technical problem of providing a system that has a comparatively high efficiency and comparatively high dynamics that is sufficient for use in fuel-cell-operated motor vehicles at low control and automatic control expenditures, and which has a very compact construction and can be built at relatively low expenditures.

The present invention solves this problem by providing a system that includes a modular reactor unit of the plate stack type, of the tube bundle type or of a combination of these two types. The modular reactor unit contains at least one evaporator, a prereforming unit, a main reformer, a CO removal unit and a catalytic burner unit in an integrated form. The presence of these components results in a high-efficiency reforming conversion, in which the concentration of the carbon monoxide contained in the reformate gas can be limited to a desired value by means of the CO removal unit. The integrated formation of these system components in the common modular reactor unit provide the prerequisite for high dynamics of the system so that it can satisfactorily react to load changes, for example, typical load changes for. motor vehicle operation. The operating performance of the system may be further advantageously influenced in that (1) the evaporator and the main reformer are in a thermal contact with the catalytic burner unit and, (2) the prereforming unit is in a thermal contact with the CO removal unit, in each case by way of a heat-conducting separating medium.

In another embodiment of the present invention, the burner unit contains at least two catalytic burners. One catalytic burner is in thermal contact with the evaporator and the other catalytic burner is in thermal contact with the main reformer, each forming one module respectively having a heat exchanger structure. The module construction for the evaporator/burner component and the main reformer/burner component promotes a flexible modular construction of the reactor unit.

In another embodiment of the present invention, the prereforming unit, like the CO removal unit, also comprises two stages. The CO removal unit comprises a CO shift stage and a CO oxidation stage that is connected behind it. The CO oxidation stage together with the first prereforming stage and the CO shift stage together with the second prereforming stage each form one module respectively having a heat exchanger structure. This modular construction again promotes a compact modular construction of the modular reactor unit and thus of the system as a whole. In a further development of this modular construction, the corresponding modules (i.e., evaporator/burner; main reformer/burner; CO oxidation stage/first prereforming stage; and CO shift stage/second prereforming stage) are arranged side-by-side. Thermally insulating separating elements may be provided between respective successive modules.

In another embodiment of the present invention, heating ducts are provided in the oxidation stage/prereforming module and/or in the shift stage/prereforming module through which the hot combustion exhaust gas of the catalytic burner unit can be guided in order to actively heat these modules.

Other objects, advantages and novel features of the present invention will become apparent from the following detailed description of the invention when considered in conjunction with the accompanying drawings.

DETAILED DESCRIPTION OF THE DRAWINGS

Figure 1:
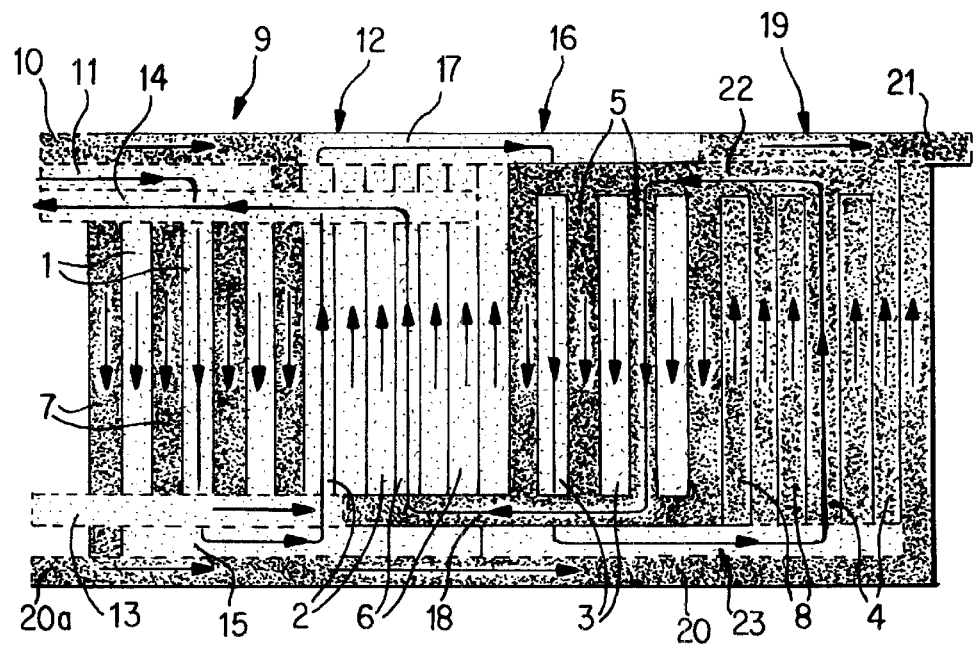
FIG. 1 is a schematic longitudinal sectional view of a modular reactor unit of the plate stack type for a system for the water vapor reforming of a hydrocarbon.

The modular reactor unit of the plate stack type schematically illustrated in FIG. 1 is suitable for use as a central part of a system for the water vapor reforming of a hydrocarbon, particularly of a mobile system for the water vapor reforming of methanol in a fuel-cell-operated motor vehicle, in order to produce the hydrogen required for the fuel cells from methanol carried along in liquid form. The modular reactor unit includes an evaporator 1; a prereforming unit that is connected behind the evaporator 1 and has a first prereforming stage 2 and a second prereforming stage 3 that is connected behind the first prereforming stage 2; a main reformer 4 connected to the second prereforming stage 3; a CO removal unit that is connected behind the main reformer and consists of a CO shift stage 5 and a CO oxidation stage 6 that is connected behind it; and two catalytic burners 7,8.

In this embodiment, one catalytic burner 7 is in thermal contact with the evaporator 1. These two system components form a corresponding evaporator/burner module 9 having a plate stack construction and a heat exchanger structure. Several parallel layers of the evaporator 1 and of the burner 7 may be arranged in an alternating sequence and, as a result, are in a thermal contact by way of heat-conducting plate walls. The evaporator/burner module 9 has a burner inlet 10 with a pertaining distributor duct to the parallel burner layers and an evaporator inlet 11 with the pertaining distributor duct for the feeding of methanol and water to the parallel evaporator layers.

The evaporator/burner module 9 is adjoined by an oxidation stage/prereforming module 12 that, in turn, has a plate stack construction having a heat exchanger structure. The oxidation stage/prereforming module 12 comprises two groups of respective alternating mutually parallel plate layers that are in a thermal contact by way of heat-conducting plate walls. One group of alternating plate layers is part of the first prereforming stage 2, while the other group of alternating plate layers represents the CO oxidation stage 6. In a matching manner, the oxidation stage/prereforming module 12 has an air inlet 13 with a pertaining distributor duct for the CO oxidation stage 6 and a reformate gas outlet 14 with a pertaining collecting duct leading away from the CO oxidation stage, the air inlet 13 and the reformate gas outlet 14 penetrating the evaporator/burner module 9. In addition, a connection duct 15 with an evaporator-side collecting duct and a prereforming-side distributor duct leads from the evaporator 1 to the first prereforming stage 2.

The oxidation stage/prereforming module 12 is adjoined by a shift stage/prereforming module 16 that is also constructed as a plate stack having a heat exchanger structure from two groups of alternating plate layers that are in a thermal contact by way of respective plate walls. In this case, one group of plate layers forms the second prereforming stage 3, while the other group of plate layers forms the CO shift stage 5. A connection duct 17 with a corresponding inlet-side collecting duct and an outlet-side distributor duct leads from the outlet of the first prereforming stage 2 to the inlet of the second prereforming stage 3, and another connection duct 18 leads from the outlet of the CO shift stage 5 to the inlet of the CO oxidation stage 6.

The shift stage/prereforming module 16 is adjoined by a reformer/burner module 19, again in the form of a plate stack construction having a heat exchanger structure, in the case of which two groups of alternating plate layers are in a thermal contact with one another by way of corresponding plate walls. One group of alternating plate layers forms the main reformer 4, while the other group of alternating plate layers forms the pertaining catalytic burner 8. A connection duct 20 is assigned to the reformer/burner module 19 and leads from the outlet side of the evaporator-side burner 7 to the inlet side of the reformer-side burner 8 and in the process passes through the intermediate modules 12 and 16. By means of the connection duct 20, the two catalytic burners 7, 8 are serially connected. By way of an inlet 20a leading into the connection duct 20, additionally oxygen-containing gas and optionally also fuel for the reformer-side burner 8 can be metered into the connection duct 20. The combustion exhaust gas leaves the reformer-side catalytic burner 8 by way of an exhaust gas outlet 21 with the pertaining collecting duct. A connection duct 22 with an inlet-side collecting duct and an outlet-side distributor duct leads from the main reformer 4 to the CO shift stage 5, and another connection duct 23 with an inlet-side collecting duct and an outlet-side distributor duct leads from the second prereforming stage 3 to the main reformer 4.

Figure 2:
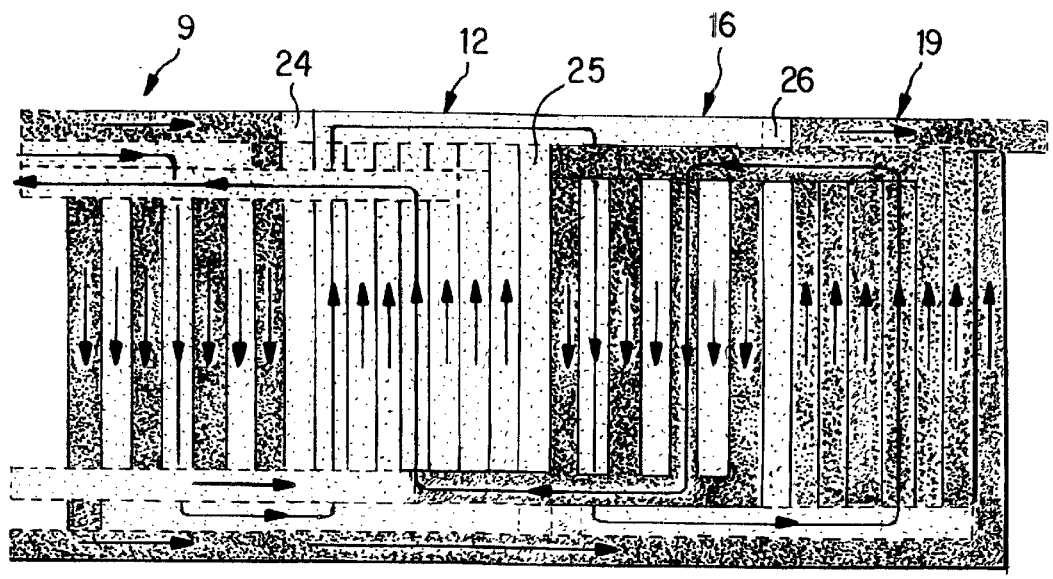
FIG. 2 is a schematic longitudinal sectional view of another modular reactor unit of the plate stack type for a system for the water vapor reforming of a hydrocarbon.

FIG. 2 illustrates another modular reactor unit that in its construction essentially corresponds to that of FIG. 1, the same reference numbers being used for functionally the same elements. The modular reactor unit of FIG. 2 differs from that of FIG. 1 in that the different modules 9, 12, 16, 19 do not adjoin one another directly but with the insertion of one thermally insulating plate 24, 25, 26 respectively. As the result, the evaporator/burner module 9 is thermally uncoupled from the oxidation stage/prereforming module 12. The oxidation stage/prereforming module 12 is thermally uncoupled from the shift stage/prereforming module 16, and the shift stage/prereforming module 16 is thermally uncoupled from the reformer/burner module 19.

As illustrated, the two modular reactor units of FIGS. 1 and 2 have a particularly compact construction with the simultaneous integration of all components advantageous for a water vapor reforming of methanol or another hydrocarbon at a high efficiency, in the form of an evaporator 1, a two-stage prereforming unit 2, 3, a main reformer 4, a two-stage CO removal unit 5, 6 and one catalytic burner 7, 8 respectively for the evaporator 1 and the main reformer 4. Each module 9, 12, 15, 19 may be constructed of an individually determinable number of plate layers so that, by means of simple modifications, an optimal adaptation is permitted to the respective application. Different performance classes can be implemented for each of the system components integrated in the modular reactor unit. In addition to the illustrated modules 9, 12, 16, 19 of the plate stack type, as an alternative, the use of functionally identical modules of the tube-bundle type is conceivable for one or several of the modules 9, 12, 16, 19.

Instead of the illustrated construction of the modules 9, 12, 16, 19, in which one plate layer of one system component alternates with one plate layer of the other system component and therefore the ratio of the number of plate layers for the two components essentially amounts to 1:1, modified modules at an arbitrary different ratio of the plate layer number of the two respective system components can be used.

Another modification of the modular reactor units illustrated in FIGS. 1 and 2 consists of providing a multi-stage CO-oxidant within the CO removal unit. In a further embodiment, heating plate layers may be integrated in the oxidation stage/prereforming module 12 and/or in the shift stage/prereforming module 16, through which heating plate layers the hot combustion exhaust gas of the catalytic burner unit 7, 8 can flow.

The compact construction of the modular reactor unit requires only little space and, because of the small surface, has comparatively low heat losses. A high efficiency of the system is achieved, that is also the result of the fact that the waste heat of the CO oxidation stage 6 and of the CO shift stage 5 is utilized for heating the prereforming stages 2, 3. By means of the plate stack arrangement and the arrangemeont of the different functional components of the system, self-regulating mechanisms are operative, which minimize the control and automatic control expenditures for the system and simultaneously ensure a high reliability of the system. Because of the low volume of the modular reactor unit and the short gas flow paths, the modular reactor unit and thus the system on the whole have comparatively high dynamics and a fast warm-up performance during a cold start. This is specifically desirable for mobile uses such as in fuel-cell-operated motor vehicles because of the typical fast load changes, since the overall mass of the modular reactor unit is relatively low and, in addition, heating elements are integrated in the form of the catalytic burners. The modular construction permits a simple scaling-up of each respective desired performance capacity of the system.

Figure 3:
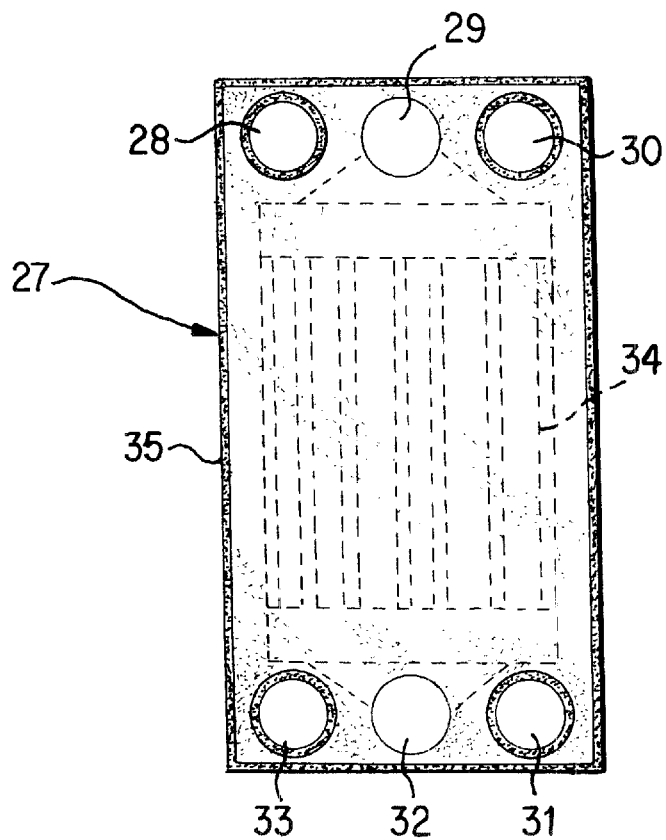
FIG. 3 is a top view of an individual plate that can be used for the modular reactor units of FIGS. 1 and 2.

FIG. 3 is a top view of a heat exchanger plate 27, as it can be used in the modular reactor units of FIGS. 1 and 2 for the evaporator/burner module 9 and in a largely similar construction for the other modules. On opposite narrow plate sides, three openings 28, 29, 30 and 31, 32, 33 respectively are provided. The openings are in the same position for the plates following one another in the stack. Thus, the openings overlap in an aligned manner while forming corresponding inlet or outlet ducts and distributor or collecting ducts. In the case of the plate 27, the center pair of the mutually opposite openings 29, 32 forms a portion of a corresponding collecting or distributor duct, for example, of the evaporator 7 and operates as a fluid inlet or fluid outlet. By way of the inlet, the fluid arrives in the plane of the plate 27 and flows from there along a supporting and distributor structure 34 provided on the plate to the opposite outlet, in that case it comes in thermal contact with the medium, such as the hot burner exhaust gas, that flows along the other plate side. The other openings 28, 30, 31, 33 framed by a thick line in FIG. 3 and the plate edge 35 form gas-tight connections by means of which the other media in the plate stack can pass through the corresponding plate layer. These openings 28, 30, 31, 33 may, for example, be part of the ignitor inlet 10, of the reformate gas outlet 14, of the air inlet 13 for the CO-oxidation stage 1 and of the connection duct 20 from the evaporator-side burner 7 to the reformer-side burner 8.

Figure 4:
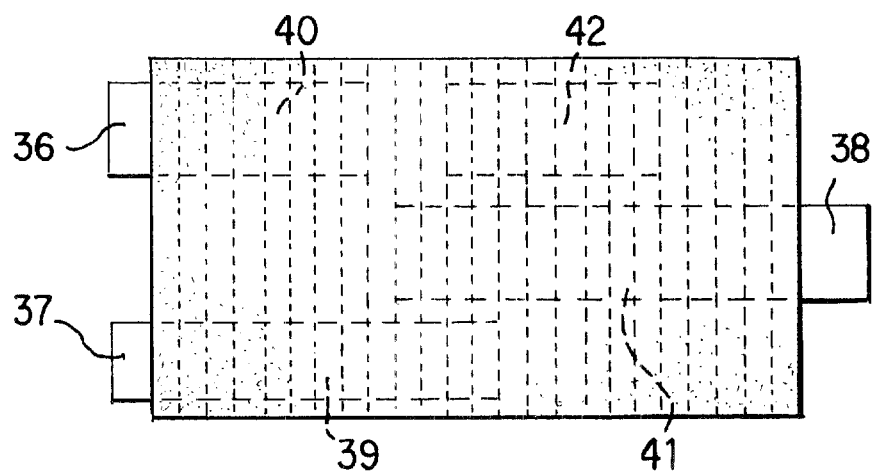
FIG. 4 is a top view of a modular reactor unit constructed according to FIG. 1.

FIG. 4 is a top view of the compact modular reactor unit of FIG. 1 with its plate stack construction. In this view, two inlet and outlets 36, 37 are illustrated on a stack face end, and another inlet or outlet 38 being illustrated at the opposite stack face end. In addition, their course into the plate stack construction for forming corresponding inlet or outlet ducts or distributor or collecting ducts 39, 40, 41 is indicated by a broken line. Furthermore, one of the interior connection ducts 42 is shown by a broken line. The other inlets and outlets also lead out on the stack face ends and, in the view of FIG. 4, are covered by the shown inlets and outlets 36, 37, 38.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for the water vapor reforming of a hydrocarbon comprising a modular reactor unit comprising:

an evaporator that evaporates the hydrocarbon;

a prereforming unit following the evaporator through which the evaporated hydrocarbon flows;

a main reformer following the prereforming unit for reforming the evaporated hydrocarbon thereby producing hydrogen and carbon monoxide;

a CO-removal unit following the main reformer for removing the carbon monoxide; and a catalytic burner unit comprising at least two catalytic burners;

wherein the evaporator has a heat exchanger structure with one of the at least two catalytic burners thereby forming a module, and the main reformer has a heat exchanger structure with a second of the at least two catalytic burners thereby forming a module and wherein the evaporator and the main reformer are in direct thermal contact with the respective catalytic burners only by way of a heat-conducting separating medium, wherein the prereforming unit is in direct thermal contact with the CO-removal unit by way of a heat-conducting separating medium, and wherein (1) the evaporator and catalytic burner module, (2) the prereforming unit and CO-removal unit, and (3) the main reformer and catalytic burner module are arranged side-by-side in this sequence.

2. The system according to claim 1, wherein the evaporator, the prereforming unit, the main reformer, the CO-removal unit and the catalytic burner unit are selected from the group consisting of a plurality of stacked plates, tube bundles, and combinations thereof.

3. The system according to claim 1, wherein the hydrocarbon is methanol.

4. The system according to claim 1, wherein the CO removal unit comprises a carbon monoxide oxidant.

5. A system for the water vapor reforming of a hydrocarbon comprising a modular reactor unit comprising:

an evaporator that evaporates the hydrocarbon;

a prereforming unit following the evaporator through which the evaporated hydrocarbon flows, wherein the prereforming unit comprises a first prereforming stage and a second prereforming stage connected behind the first prereforming stage;

a main reformer following the prereforming unit for reforming the evaporated hydrocarbon thereby producing hydrogen and carbon monoxide;

a CO-removal unit following the main reformer for removing the carbon monoxide, wherein the CO removal unit comprises a CO shift stage and a CO oxidation stage, the CO oxidation stage and the first prereforming stage forming a first module having a heat exchanger structure, and the CO shift stage and the second prereforming stage forming a second module having a heat exchanger structure, wherein the prereforming unit is in direct thermal contact with the CO-removal unit by way of a heat-conducting separating medium; and a catalytic burner unit comprising at least two catalytic burners;

wherein the evaporator has a heat exchange structure with one of the at least two catalytic burners thereby forming a module, and the main reformer has a heat exchange structure with a second of the at least two catalytic burners thereby forming a module, and wherein the evaporator and the main reformer are in direct thermal contact with the respective catalytic burners only by way of a heat-conducting separating medium.

6. The system according to claim 5, wherein the evaporator and at least one catalytic burner module, the first module, the second module, and the main reformer and at least one catalytic burner module are arranged side-by-side in this sequence.

7. The system according to claim 6, wherein thermally-insulating separating elements are provided between the modules.

8. The system according to claim 6, further comprising heating ducts in at least one of the first module and the second module, through which combustion exhaust gases from the at least two catalytic burners are guided.

9. A system for the water vapor reforming of a hydrocarbon comprising a modular reactor unit, comprising:

a first module comprising an evaporator that evaporates the hydrocarbon and a first catalytic burner in direct thermal contact with the evaporator only by way of a heat-conducting separating medium;

a second module comprising a first prereforming unit through which the evaporated hydrocarbon flows and a CO-oxidation stage;

a third module comprising a second prereforming unit through which partially reformed hydrocarbon flows from the first prereforming unit and a CO-shift stage; and a fourth module comprising a main reformer for further reforming the partially reformed hydrocarbon and a second catalytic burner in direct thermal contact with the main reformer only by way of a heat-conducting separating medium, wherein the modules are sequentially connected.

10. A system according to claim 9, wherein the second module further comprises an air inlet and a reformate gas outlet that extend through the first module.

11. A system according to claim 9, further comprising a connection duct that leads from the first module to the fourth module and passes through the second and third modules, thereby connecting the first and second catalytic burners.

12. The system according to claim 1, wherein each of the evaporator, the prereforming unit, the main reformer, the CO-removal unit and the catalytic burner unit comprises a plurality of stacked plates.

13. The system according to claim 1, wherein the evaporator and catalytic burner module comprises alternating plates.

14. The system according to claim 1, wherein the main reformer and catalytic burner module comprises alternating plates.

15. The system according to claim 1, wherein the prereforming unit and CO-removal unit comprises alternating plates.

* * * * *